United States Patent [19]
Kawasaki

[11] Patent Number: 5,497,186
[45] Date of Patent: Mar. 5, 1996

[54] CATV SYSTEM IN WHICH MESSAGE RECEPTION CAN BE CONFIRMED BY A VIEWER

[75] Inventor: Masahiko Kawasaki, Tokyo, Japan

[73] Assignee: Pioneer Electronic Corporation, Tokyo, Japan

[21] Appl. No.: 913,015

[22] Filed: Jul. 14, 1992

[30] Foreign Application Priority Data

Sep. 10, 1991 [JP] Japan .................................. 3-230116

[51] Int. Cl.⁶ .................................................. H04N 7/16
[52] U.S. Cl. ............................ 348/6; 348/10; 348/473; 455/6.1
[58] Field of Search ............................ 358/84, 86, 407, 358/408, 434, 438, 440, 405; 455/2, 4.2, 5.1, 6.1; 348/6, 10, 11, 12, 8, 9, 13, 473, 468; H04N 7/16, 7/173

[56] References Cited

U.S. PATENT DOCUMENTS

| | | | |
|---|---|---|---|
| 4,546,382 | 10/1982 | McKenna et al. | 358/84 |
| 4,716,410 | 12/1987 | Nozaki | 358/86 |
| 4,745,468 | 5/1988 | Van Kohorn | 455/2 |
| 4,916,737 | 4/1990 | Chomet et al. | 455/2 |
| 4,926,256 | 5/1990 | Nanba | 455/2 |
| 4,961,109 | 10/1990 | Tanaka | 455/2 |
| 5,091,937 | 2/1992 | Kawasaki | 455/2 |
| 5,359,419 | 10/1994 | Kawasaki | 348/6 |

*Primary Examiner*—Victor R. Kostak
*Assistant Examiner*—Chris Grant
*Attorney, Agent, or Firm*—Sughrue, Mion, Zinn, Macpeak & Seas

[57] ABSTRACT

A center facility transmits, together with a television signal carrying a broadcast program, a message directed to a particular terminal apparatus, address data indicating an address of the particular terminal apparatus, and information quantity data indicating a quantity of the message. Recognizing that the user's terminal apparatus corresponds to the particular terminal based on the address data, the particular terminal apparatus displays all of the message on a TV receiver based on the information quantity data, and finishes the display of the message when receiving the user's instruction indicating reception of all the message.

15 Claims, 6 Drawing Sheets

CATV SYSTEM IN WHICH MESSAGE RECEPTION CAN BE CONFIRMED BY A VIEWER

BACKGROUND OF THE INVENTION

The present invention relates to message transmission in a CATV (cable television or community antenna television) system.

In CATV systems, a center facility provides programs and commercial broadcast programs on the air to a plurality of subscriber terminal apparatuses via transmission cables. In recent years, services of CATV systems include data transmission. Further, bi-directional CATV systems are now limitedly operated in which each terminal apparatus can transmit a signal (i.e., an up signal) to a center facility. CATV systems operated in schools, hotels, etc. are specifically called "CCTV (closed circuit television) systems".

In the CATV systems, it is sometimes necessary for the center facility to transmit some messages to a particular terminal apparatus. For example, it may be the case that a message is to be transmitted to guests who stay at a hotel for the purpose of attending an international conference to notify them of a schedule change of a symposium on the next day. In such a case, the center facility sends a message command indicating the existence of a message to the related terminal apparatuses. In response, each terminal apparatus informs the user (viewer) of the existence of a message by producing some notification such as flashing of an LED or a buzzer sound. Recognizing this notification, the user turns on his terminal apparatus and TV receiver to see the contents of the message directed to him.

However, in the above CATV systems, if there exists a possibility that a message to be transmitted to a user has a length corresponding to, for instance, three pictures (pages) of the TV receiver screen (in addition to the case of a one-page message), the center facility cannot confirm the user's reception of the entire message, and the user cannot know whether he has received the entire message. Therefore, the confirmation of the reception of all the message should be performed separately, for instance, by telephone. This causes a problem that a message, which is important information, cannot be received positively by all of the intended users.

SUMMARY OF THE INVENTION

The present invention has been made in consideration of the above problems in the art, and has an object of providing a CATV system in which all of the contents of a message transmitted from a center facility can positively be received by a user on the terminal apparatus side.

According to the invention, a CATV system comprises:
 a center facility for transmitting, together with a television signal carrying a broadcast program, a message directed to a particular terminal apparatus, address data of the particular terminal apparatus, and quantity data indicating a quantity of the message; and
 a plurality of terminal apparatuses for displaying all of the message on an associated TV receiver based on the quantity data when the address data indicates that an own terminal apparatus corresponds to the particular terminal apparatus, and for finishing the display of the message when receiving an instruction from a user indicating his reception of all the message.

DESCRIPTION OF THE PREFERRED EMBODIMENT

An embodiment of the present invention is described hereinafter with reference to the accompanying drawings.

Figure 1:
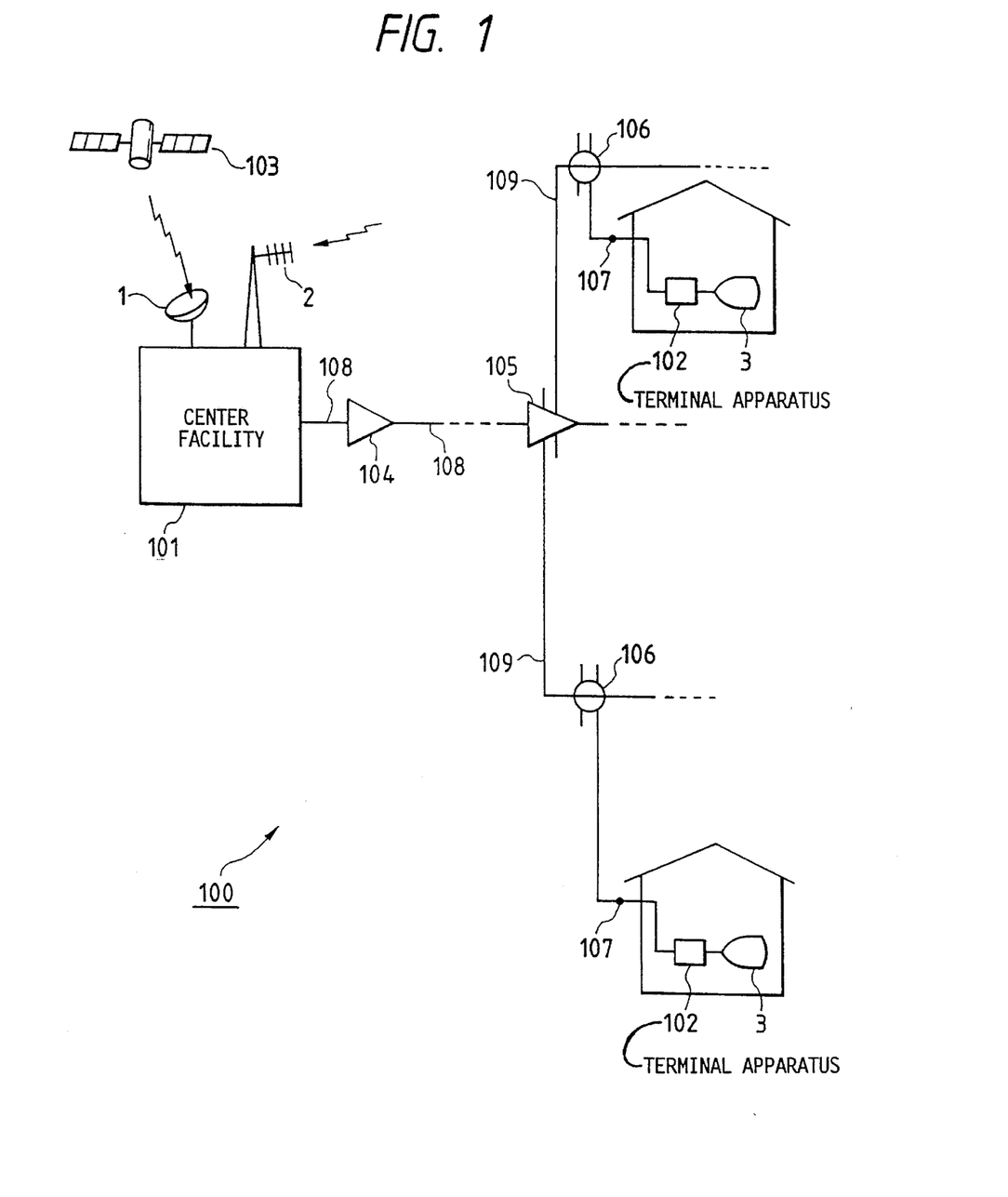
FIG. 1 is a block diagram showing a configuration of a CATV system according to an embodiment of the present invention.

FIG. 1 shows a configuration of a CATV system according to an embodiment. A CATV system 100 includes a center facility (head end) 101, a plurality of terminal apparatuses 102 and TV receivers 3 connected to the respective terminal apparatuses 102. The center facility 101 receives by an antenna 1 commercial programs transmitted from a satellite 103, and also receives ground-wave commercial programs by an antenna 2. Further, the center facility 101 produces its own programs and messages (described later). After being subjected to a scrambling operation for prohibiting unauthorized viewing of certain programs, a television signal is distributed to the respective terminal apparatuses 102 via transmission paths consisting of a main transmission cable 108, a main line amplifier 104, a main line branching amplifier 105, branch transmission cables 109, branching devices 106 and maintenance devices 107. In general, the distribution service is performed based on contracts with users (viewers) to provide them with chargeable programs and free programs.

The transmitted television signal is received by the terminal apparatus 102, subjected to a descrambling operation etc., and finally sent to the TV receiver 3 for viewing by the user.

Figure 2:
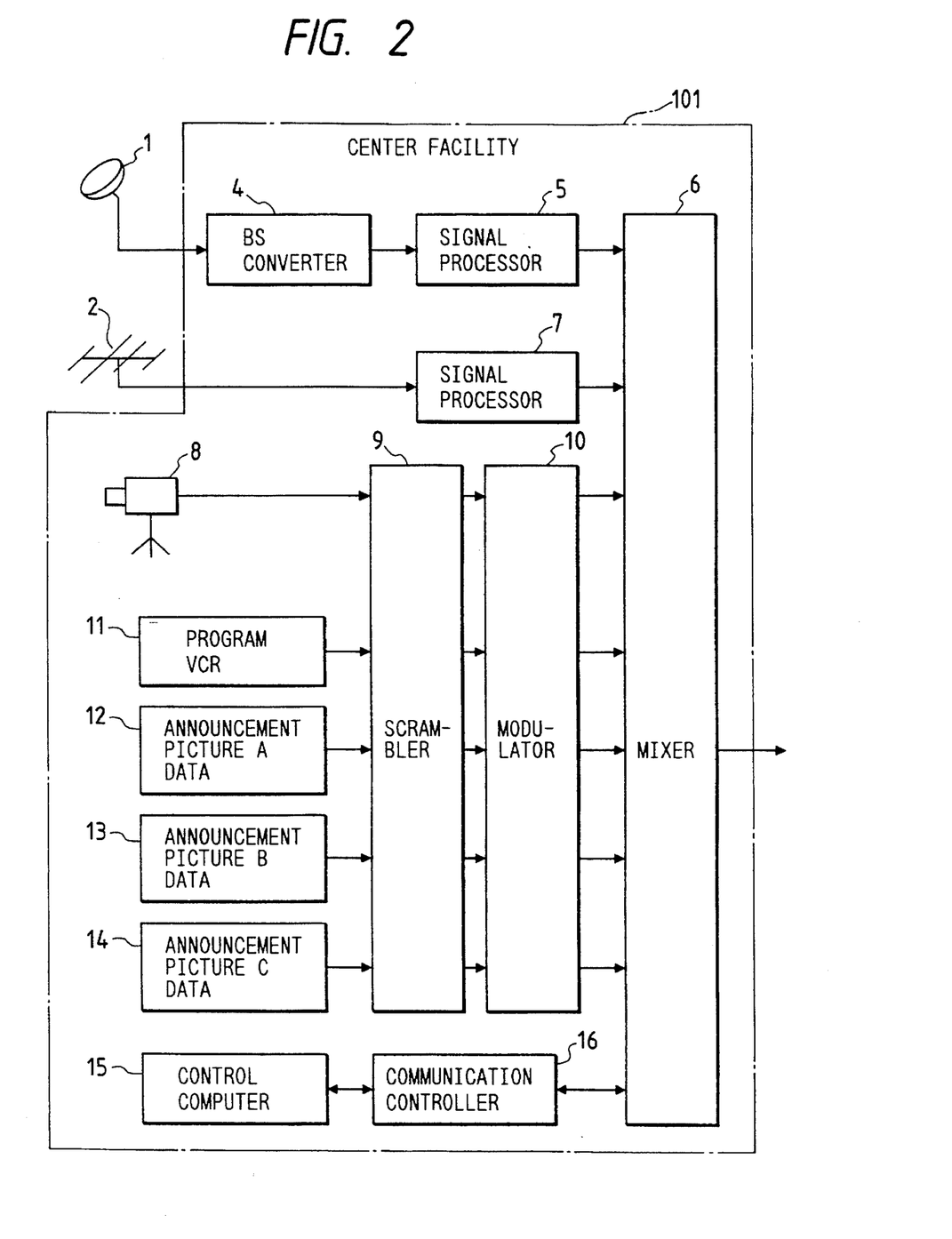
FIG. 2 is a block diagram showing a configuration of a center facility of FIG. 1.

FIG. 2 shows a configuration of the center facility 101. The center facility 101 includes the satellite-wave antenna 1, a BS converter 4 for frequency-converting a signal received by the antenna 1, a signal processor 5 and a mixer 6. A signal received by the ground-wave antenna 2 is also provided to the mixer 6 via a signal processor 7. A video part of a signal from a TV camera 8 or a program VCR 11, i.e., a signal of a program prepared in the center facility 101 is scrambled by a scrambler 9 according to, e.g., the GSS (gated sync suppression) system to prohibit unauthorized viewing, modulated by a modulator 10, and finally provided to the mixer 6.

In addition to the program signal mentioned above, massages (i.e., announcement information directed to a particular terminal apparatus), that are, for instance, in the form of announcement picture A data 12, announcement picture B data 13 and announcement picture C data 14, are sent to the mixer 6 via the scrambler 9 and modulator 10. These announcement picture data may be character data that is produced by a character generator from character messages announcing, for instance, a change or cancellation of an event of a local community. It is not always necessary to input the announcement picture data to the scrambler 9. That is, the announcement picture data may directly be input to the modulator 10 without being subjected to the scrambling operation.

If there exists announcement picture data to be transmitted, a message command is generated by the control computer 15 and sent out via the communication controller 16 and mixer 6 to the related terminal apparatus. For example, the message command has the following structure: [terminal address]+ [announcement command] + [number of announcement channels] + [announcement channel A selection information] + [announcement channel B selection information] + [announcement channel C selection information] + . . . The "terminal address" means address data to identify the terminal apparatus to which the message is to be transmitted, and may be address data for grouped addresses. The "announcement command" is a command indicating the existence of a message directed to a particular terminal apparatus. The "number of announcement channels" means the total number of channels through which messages are transmitted. If the number of channels is three, that is, if there exist channels A, B and C, information for selecting those channels A–C follows the "number of announcement channels". These commands are usually transmitted according to the frequency shift keying (FSK) method. In the above example, information quantity data consists of the "announcement command", "number of announcement channels" and "selection information" of the respective channels.

Figure 3:
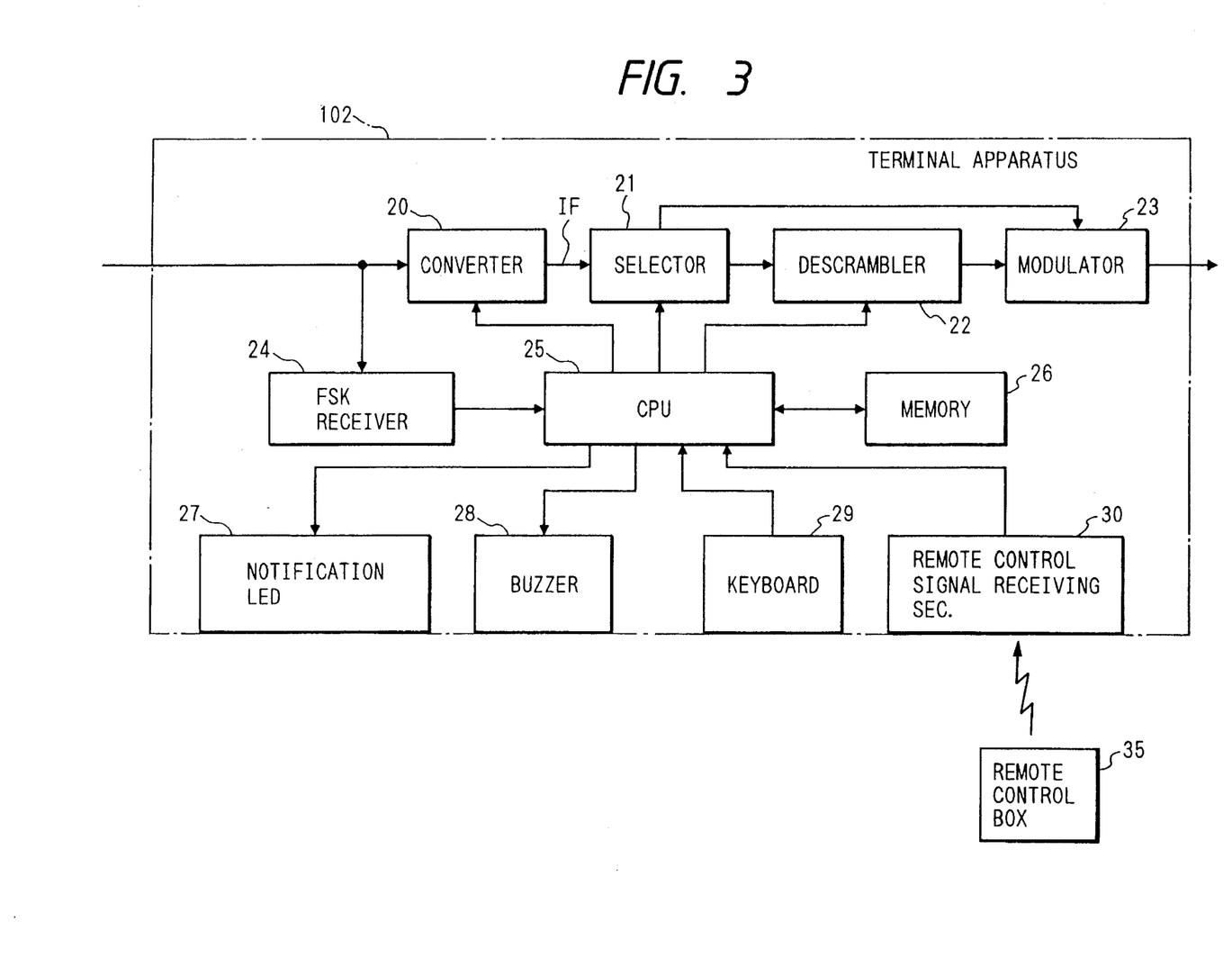
FIG. 3 is a block diagram showing a configuration of a terminal apparatus of FIG. 1.

FIG. 3 is a block diagram showing a configuration of the terminal apparatus 102. In the case of ordinary broadcast programs, an RF signal sent from the center facility 101 is input to a converter 20. The converter 20 selects a desired signal of a particular channel among input signals, and frequency-converts the selected signal to produce an intermediate frequency signal IF, which is provided to a descrambler 22 via a selector 21.

The descrambler 22 extracts scrambling data that is superimposed on, e.g., the sound carrier of the intermediate frequency signal IF, e.g., by AM detection, and performs a descrambling operation. The descrambled signal is input to a modulator 23, which sends the TV receiver 3 an RF signal whose audio part is frequency-modulated and video part is amplitude-modulated. In the case of receiving a free broadcast of a free program and an all-around emergency broadcast of, e.g., an earthquake or storm warning, the intermediate frequency signal IF is directly provided from the selector 21 to the modulator 23, i.e., without passing through the descrambler 22.

Figure 4:
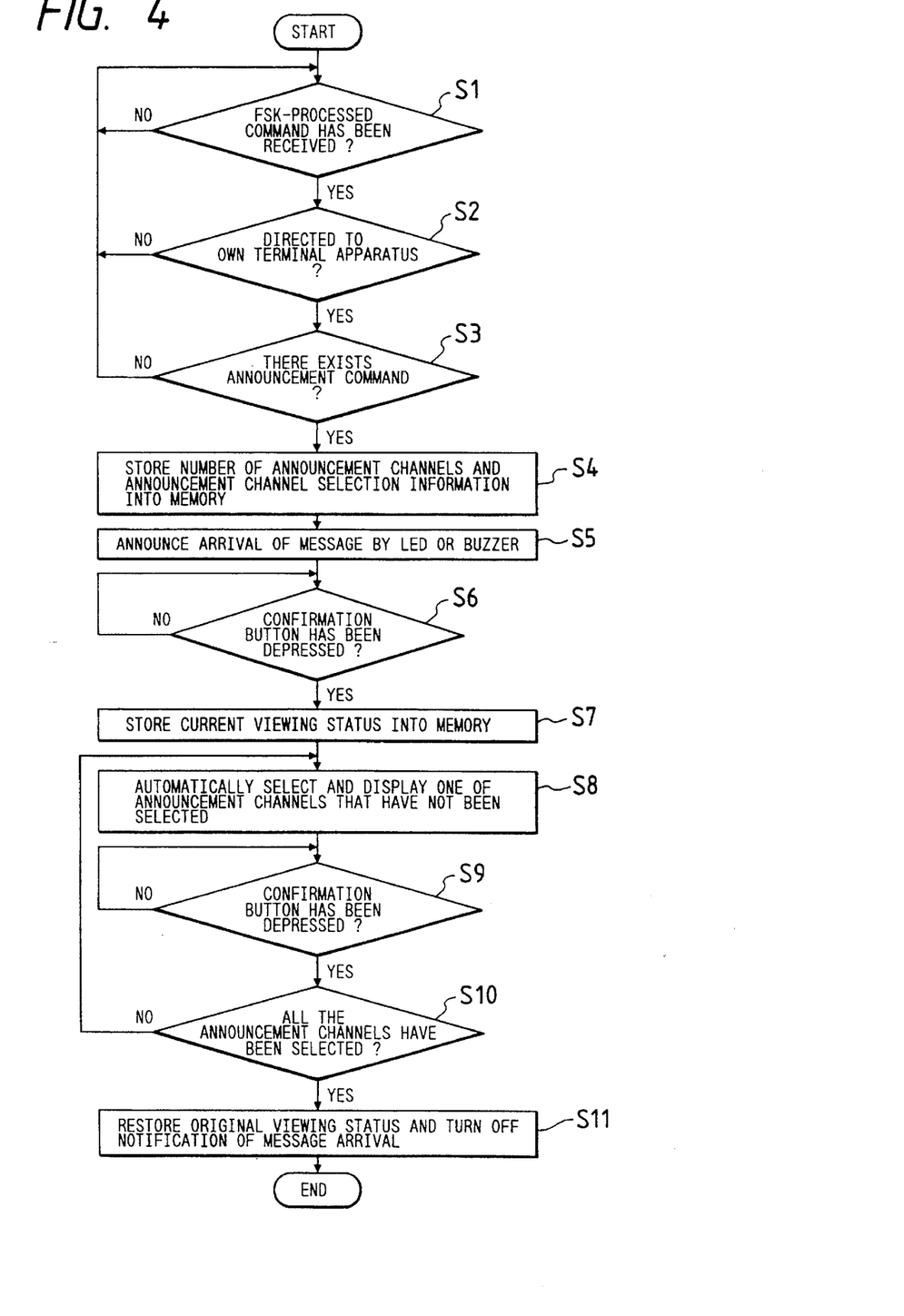
FIG. 4 is a flowchart showing the operation performed by the terminal apparatus.

When a message is transmitted to a particular terminal apparatus 102 from the center facility 101, the FSK-processed command as described above is transmitted together with the message. FIG. 4 is a flowchart showing an operation performed by the terminal apparatus 102.

In step S1, the transmitted command is received by the FSK receiver 24 and input to the CPU 25. In step S2, it is judged from the terminal address data whether the command is directed to the own terminal apparatus. If the command is directed to the own terminal apparatus, it is checked in step S3 whether an announcement command exists to judge whether a message exists. If there exists a message, in step S4 the number of the announcement channels and the announcement channel selection information are transferred from the CPU 25 to the memory 26 and temporarily stored therein. Further, in step S5, a notification LED 27 is flashed or a buzzer 28 is activated to inform the user of the existence of the message transmitted from the center facility 101.

Figure 5A:
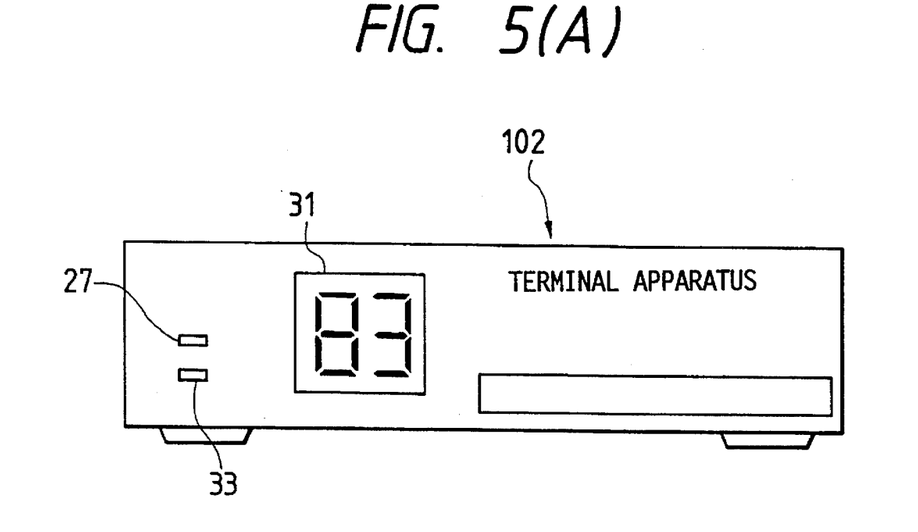
FIGS. 5(A) and 5(B) show an appearance of the terminal apparatus.
Figure 5B:
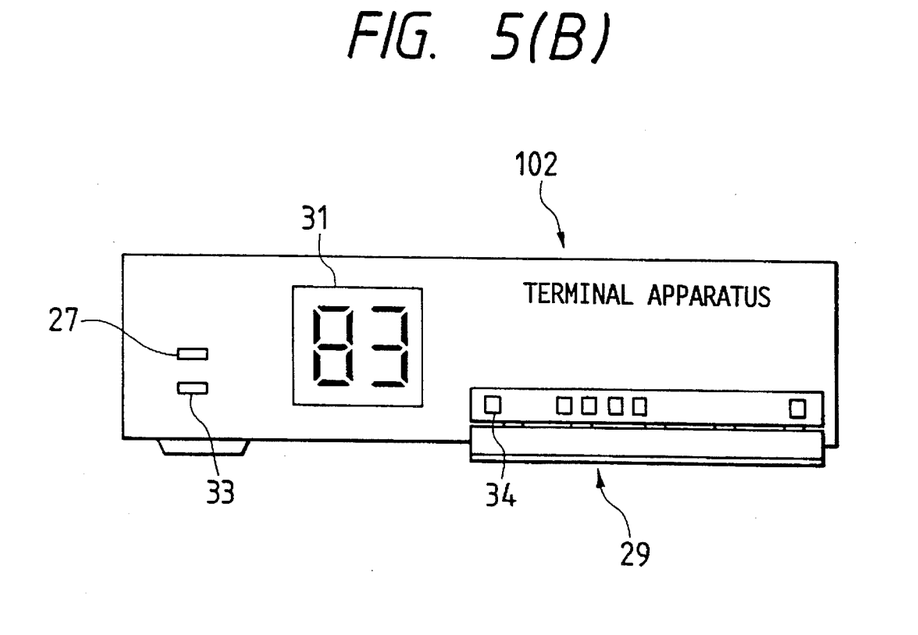

FIGS. 5(A) and 5(B) show an appearance of the terminal apparatus 102. A liquid crystal display unit 31 displays a channel number of a selected channel, and other information. Reference numeral 27 represents the above-mentioned notification LED. A standby indicating LED 33 indicates whether or not the terminal apparatus 102 is in the standby (power-on) state. Numeral 29 represents a keyboard that is usually placed inside the panel.

From the flashing of the notification LED 27 or the sounding of the buzzer 28 the user recognizes that some message is being transmitted from the user to his terminal apparatus 102. If the user wants to see the message, he depresses an announcement confirmation button 34 provided on the keyboard 29 or an announcement confirmation button K2 provided on a remote control box 35 (see FIG. 6). When it is judged in step S6 that the confirmation button 34 has been depressed, in step S7 the current viewing status (e.g., a channel number of a current channel if it is a channel of a broadcast program other than a channel now going to be selected, and a current sound volume) is stored into the memory 26.

In step S8, one of the announcement channels that have not been selected yet is automatically selected for display based on the number of the announcement channels and the announcement channel selection information that are stored in the memory 26. For example, if the announcement channels are A, B and C, channel A may be selected in accordance with the order of the channel numbers. If it is judged in step S9 that the announcement confirmation button has been depressed, it is then judged in step S10 whether all the announcement channels have been selected. If not all the announcement channels have been selected, one of the remaining announcement channels is automatically selected in step S8 in the same manner as the above upon every depression of the confirmation button. The notification LED 27 continues to flash during the above operation. Where the buzzer 28 is activated to inform the arrival of the message, the buzzer 28 may continue to sound or may be turned off after the first depression of the announcement confirmation button in step S6 because the buzzer sound may be a disturbance to the viewing of the message. If all the announcement channels have been selected as a result of certain times of iteration of steps S8–S10, in step S11 the viewing status is returned to the original status stored in the memory 26 and the notification by, e.g., the LED 27 is stopped. If the original viewing status is "TV receiver is off", the TV receiver 3 is also turned off. In the above operation, the last depression of the announcement confirmation button corresponds to a confirmation instruction. In this manner, each message from the center facility 101 can be seen by the viewer in its entirety.

The terminal apparatus 102 may be adapted such that the CPU 25 outputs an appropriate code signal to automatically turn on the TV receiver 3 in response to the first depression of the announcement confirmation button in step S6 if the TV receiver 3 is off at that time. This construction will provide the user with a convenience because it is not necessary for the user to perform a two-step operation of first turning on the TV receiver 3 and then confirming his recognition of the message arrival.

Figure 6:
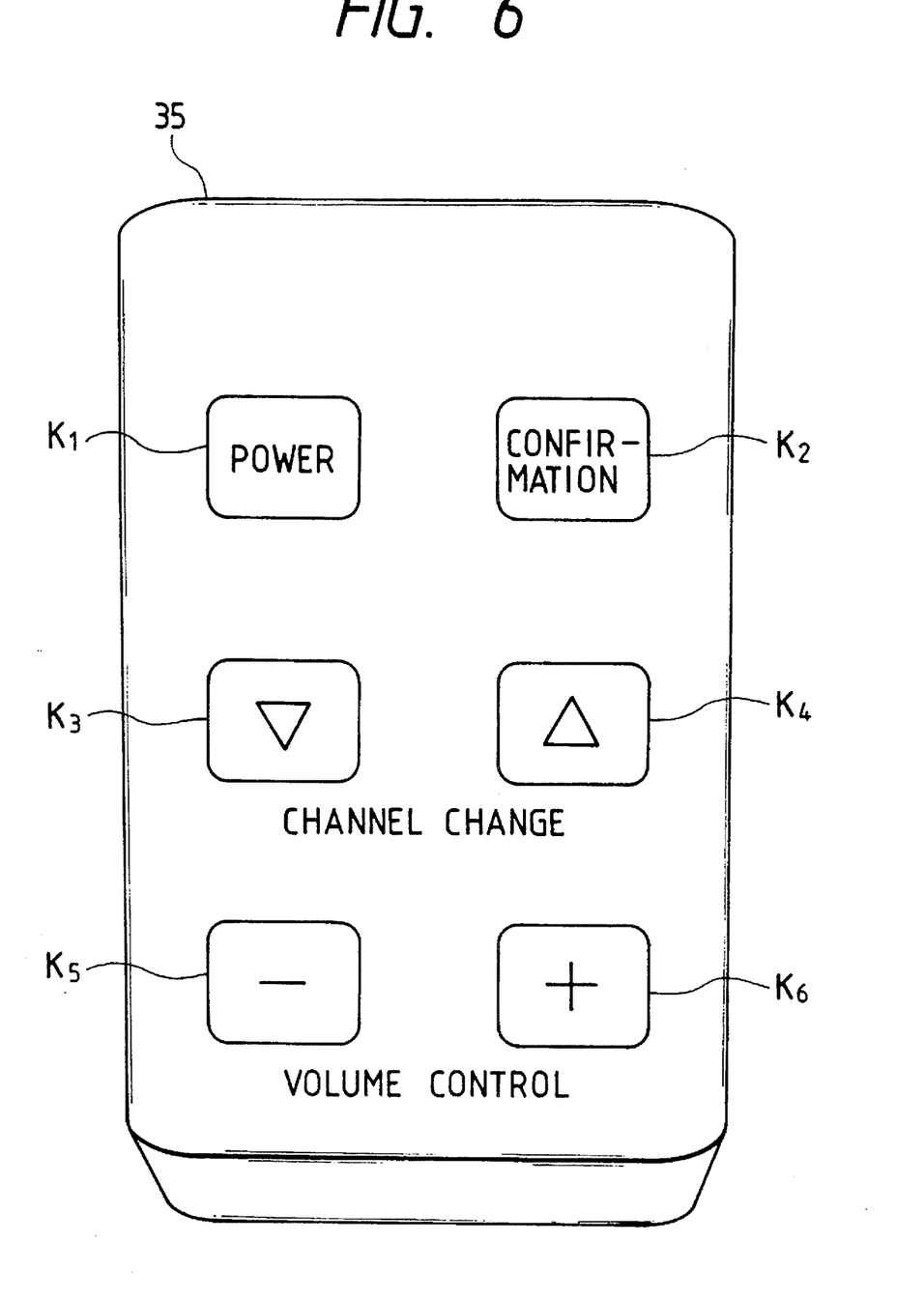
FIG. 6 shows buttons provided on a remote control box.

FIG. 6 shows the remote control box 35. Symbol K1 represents a power switch; K2, the announcement confirmation button; K3 and K4, channel changing keys; and K5 and K6, volume control keys.

While the above embodiment is directed to the case of transmitting a message to a particular terminal apparatus, the invention can be applied to the case of all-around broadcast to all the terminal apparatuses, for instance, at the occurrence of a disaster such as an earthquake or a storm.

While in the above embodiment the message pictures are sequentially displayed in accordance with the user's depressions of the announcement confirmation button, they may be displayed automatically under the control of the CPU 25, which is explained below. Since the number of the announcement channels and the announcement channel selection information have been retained in the terminal apparatus 102 in step S4 of FIG. 4, based on these data the CPU 25 automatically effects an endless procedure of displaying cyclically (for instance, channel A→B→C→A→B→C) the announcement pictures of the respective channels while allocating 5–10 seconds for each picture display. The notification LED 27 or buzzer 28 may be kept operating during this procedure, and the message display and the notification LED 27 or buzzer 28 may be turned off only when the announcement confirmation button is depressed. Further, the terminal apparatus 102 may be adapted in the following manner to accommodate the case of erroneous depression of the announcement confirmation button in spite of the situation that the user has not seen all the messages. That is, the above endless display procedure is reactivated to provide the message display to thereby complete the message reception by the user when the announcement confirmation button is depressed even times. The message display procedure is finished when the announcement confirmation button is depressed even times. This procedure will be particularly effective at the occurrence of a disaster. In the above case, the depression of the announcement confirmation button corresponds to the confirmation instruction.

The above embodiment is described with an assumption that the CATV system is of the OWA (one-way addressable) type. It can be used as a bi-directional system by making the following modifications. That is, to enable bi-directional communication, in the center facility 101 the control computer 15 and communication controller 16 are made capable of receiving a signal (see FIG. 2), and in the terminal apparatus 102 the FSK receiver 24 is changed to a FSK transceiver. Further, when all the messages have been seen by the user in step S11 of FIG. 4 or when the final depression of the announcement confirmation button is made, the terminal apparatus sends to the center facility an up signal indicating completion of the message reception. With this bi-directional construction, the center facility can recognize how much of the message has been received by the user on the terminal apparatus side.

As described in the foregoing, according to the invention, each page of each message from the center facility can positively be received by the user on the terminal apparatus side by the user's proper operations. The user can recognize that he has received each page of each message. By grouping the addresses of the terminal apparatuses, messages of a large quantity can positively be provided to particular users at one time.

What is claimed is:

1. A CATV system comprising:

a center facility for transmitting, together with a television signal carrying a broadcast program, a message directed to a particular terminal apparatus, address data of the particular terminal apparatus, and quantity data indicating a quantity of the message; and a plurality of terminal apparatuses each operable to receive said address data, wherein the address data enables said particular terminal apparatus to display the entire message on an associated TV receiver based on the quantity data and to finish the display of the message when receiving an instruction from a user indicating reception of the entire message.

2. The CATV system of claim 1, wherein the quantity data includes first data indicating a number of channels to which the message is allocated and second data necessary for the particular terminal apparatus to select the respective channels, and wherein the particular terminal apparatus displays the entire message while sequentially selecting the channels based on the first and second data.

3. The CATV system of claim 2, wherein the sequential selection of the channels is performed in response to an instruction from the user confirming reception of part of the message that is transmitted through each of the channels.

4. The CATV system of claim 2, wherein the sequential selection of the channels is automatically performed by the particular terminal apparatus in a cyclical manner.

5. The CATV system of claim 1, wherein each of the plurality of terminal apparatuses comprises means for transmitting to the center facility a signal indicating that the entire message has been received by the user.

6. The CATV system of claim 1, wherein said message comprises at least one page; and said quantity data indicates the number of pages in said message.

7. A terminal apparatus of a CATV system that receives video information transmitted from a center facility through a cable, comprising:

means for receiving a series of messages, address data indicating grouped addresses, and quantity data indicating a quantity of the series of messages all of which are transmitted from the center facility;

authority means for judging from the received address data whether said terminal apparatus can receive the series of messages;

a confirmation button to be operated by a user to confirm completed reception of at least one of the series of messages;

control means for performing a control operation to change a tuning frequency upon every operation of the confirmation button and to have the series of messages displayed on a page-by-page basis; and means for notifying the user that all of the series of messages has been displayed.

8. The terminal apparatus of claim 7, wherein the control means comprises means for notifying, by a warning indication or a buzzer sound, the user that there remains a message to be received.

9. The terminal apparatus of claim 7, wherein the quantity data indicates a series of channels to which all of the series of messages are allocated.

10. The terminal apparatus of claim 9, further comprising means for changing the tuning frequency upon every operation of the confirmation button in accordance with a predetermined order of the series of channels.

11. The terminal apparatus of claim 7, wherein said quantity data indicates the number of messages received.

12. The terminal apparatus of claim 7, wherein said quantity data indicates the total number of pages in said series of messages received.

13. A method of transmitting a series of messages in a CATV system in which video information is transmitted from a center facility to a plurality of terminal apparatuses through cables, said method comprising the steps of:

transmitting the series of messages, address data indicating grouped addresses, and quantity data indicating a quantity of the series of messages;

judging, in each terminal apparatus, whether a predetermined address is included in the grouped addresses;

displaying a first message based on first control designation data included in the quantity data;

receiving a first confirmation that a user has completed reception of the first message, the first confirmation being made by an operation of a confirmation button by the user;

displaying a next message upon every reception of the first confirmation; and indicating that all of the series of messages has been displayed based on a last control designation data included in the quantity data.

14. The method of claim 13, wherein the quantity data includes a series of channel data that sequentially designate the series of messages.

15. The method of claim 13, further comprising the steps of:

notifying, when it has been judged that the predetermined address is included in the grouped addresses, the user of arrival of the series of messages; and receiving a second confirmation indicating that the user intends to receive the series of messages, the second confirmation being made by the operation of the confirmation button.

* * * * *